United States Patent
Bosworth

(10) Patent No.: US 10,725,480 B2
(45) Date of Patent: Jul. 28, 2020

(54) SYSTEMS AND METHODS FOR GROUND INTEGRITY MEASUREMENT

(71) Applicant: Aurora Flight Sciences Corporation, Manassas, VA (US)

(72) Inventor: William Bosworth, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 106 days.

(21) Appl. No.: 15/994,118

(22) Filed: May 31, 2018

(65) Prior Publication Data

US 2019/0369646 A1 Dec. 5, 2019

(51) Int. Cl.
| | | |
|---|---|---|
| *G06F 19/00* | (2018.01) | |
| *G06G 7/70* | (2006.01) | |
| *G05D 1/06* | (2006.01) | |
| *G01P 1/12* | (2006.01) | |
| *B64C 29/00* | (2006.01) | |

(52) U.S. Cl.
CPC ....... *G05D 1/0684* (2013.01); *B64C 29/0008* (2013.01); *G01P 1/127* (2013.01)

(58) Field of Classification Search
CPC .... G05D 1/0684; B64C 29/0008; G01P 1/127
See application file for complete search history.

(56) References Cited

U.S. PATENT DOCUMENTS

| | | | | |
|---|---|---|---|---|
| 6,178,820 B1* | 1/2001 | Kirjavainen | ........... | G01H 11/06 310/329 |
| 9,055,893 B2* | 6/2015 | Kandori | ................. | A61B 5/103 |
| 9,222,866 B2* | 12/2015 | Cline | ..................... | G01N 3/303 |
| 2004/0099800 A1* | 5/2004 | Lagakos | ............... | G01L 9/0077 250/227.14 |
| 2006/0214622 A1* | 9/2006 | Summer | .............. | B62D 57/032 318/568.12 |
| 2009/0256692 A1* | 10/2009 | Hadi | ....................... | B60Q 5/00 340/435 |
| 2015/0211199 A1* | 7/2015 | Corcoran | .................. | E02D 1/00 404/122 |
| 2017/0355431 A1* | 12/2017 | Jun | ...................... | B62D 57/032 |
| 2018/0280822 A1* | 10/2018 | Murthy | .................. | A63H 33/26 |
| 2019/0136486 A1* | 5/2019 | Berque | ................... | F03D 80/85 |

OTHER PUBLICATIONS

Will Bosworth, "Perception and control of robot legged locomotion over variable terrain," Submitted to the Department of Mechanical Engineering on Aug. 20, 2016, in partial fulfillment of the requirements for the degree of Doctor of Philosophy in Mechanical Engineering.
Daniel A. Gussell, Ph.D., "Forces between Bat and Ball," Physics and Acoustics of Baseball & Softball Bats, Copyright 2001-2011.

* cited by examiner

*Primary Examiner* — Harry Y Oh
(74) *Attorney, Agent, or Firm* — Michael Stanley Tomsa; McAndrews, Held & Malloy, Ltd.; Eugene H. Nahm

(57) ABSTRACT

A device to determine integrity of a surface includes an exterior housing to contain and protect a plurality of components. The components include an accelerometer to measure a change in acceleration of the device, a microcontroller to monitor measurement data from the accelerometer and determine the integrity of the surface based on the measurement data. A communication circuit transmits or displays information regarding the integrity of the surface from microcontroller. A battery powers the plurality of components.

20 Claims, 7 Drawing Sheets

SYSTEMS AND METHODS FOR GROUND INTEGRITY MEASUREMENT

FIELD

The present disclosure relates to the systems, methods, and apparatuses to assess the integrity of a surface; even more particularly, to a system, method, and apparatus for a payload configured to measure impact dynamics (e.g., changes in acceleration and time) based on contact with the surface (e.g., ground, terrain, landing pad) to assess the integrity (e.g., hardness) of the surface.

BACKGROUND

Terramechanics refers to the measurement of terrain, including those pertaining to the study of properties of the earthen terrain and interactions of vehicles (e.g., wheeled and/or tracked vehicles) as they come into contact with and/or traverse various surfaces (e.g., dirt, rock, dense vegetation). Conventional machines and equipment used in determining terramechanics measurements are usually not lightweight and/or portable and thus may not be suitable for deployment in an aircraft. Accordingly, a need exists for a system, method, and apparatus for determining terramechanics measurements in an aircraft.

SUMMARY

The present disclosure is directed to systems, methods, and apparatuses for a payload configured to measure impact dynamics (e.g., change in acceleration) based on contact with the surface (e.g., ground, terrain, landing pad) to assess the integrity (e.g., hardness) of the surface. For example, measurements from the payload's accelerometers can be used to determine whether the target surface is hard ground, soft ground, marshland, or water. This determination may inform the operator of a vertical take-off and landing (VTOL) aircraft (e.g., human and/or computer operator) whether the targeted surface is suitable to land the aircraft safely.

According to a first aspect, a device to determine integrity of a surface comprises: an exterior housing to contain and protect a plurality of components, including: an accelerometer to measure a change in acceleration of the device; a microcontroller to: monitor measurement data from the accelerometer; and determine the integrity of the surface based on the measurement data; a communication circuit to transmit or display information regarding the integrity of the surface from microcontroller; and a power source to power the plurality of components.

In certain aspects, the microcontroller is configured to: compare the measured change in acceleration to a plurality of stored acceleration values corresponding to one or more parameters associated with surface integrity; and determine the integrity of the surface based on the comparison.

In certain aspects, the microcontroller is configured to identify one or more events based on the measurement data, the events including descent and impact with the surface.

In certain aspects, the one or more parameters comprise a change in acceleration during a descent phase or a change in acceleration during an impact phase.

In certain aspects, the one or more parameters further comprises a time duration of the flight phase or a time duration of the impact phase.

In certain aspects, the microcontroller is configured to associate the impact with one or more surface integrity classifications based on the acceleration data, the surface integrity classifications including a hard surface, a soft surface, and liquid.

In certain aspects, the communication circuit comprises one of a transponder, a transceiver, or a repeater.

In certain aspects, the communication circuit is configured to transmit the measurement data to a remote processor to determine the integrity of the surface.

In certain aspects, the exterior housing comprises a rigid external structure having a flexible internal structure to support and insulate the accelerometer from the rigid external structure.

In certain aspects, the exterior housing is generally spherical and comprises a compliant material.

In certain aspects, the exterior housing is sealed and the device is configured to float.

In certain aspects, the device further comprises a display to generate a lighted signal indicating the integrity of the surface.

In certain aspects, the device comprises the first-mentioned accelerometer and two additional accelerometers that cooperate to measure changes in acceleration along three orthogonal axes.

In certain aspects, the remote processor is associated with an aircraft and is used to determine whether the surface is suitable for landing by the aircraft.

According to a second aspect, a method of determining integrity of a surface comprises: measuring, by an accelerometer, a first change in acceleration of a device traveling toward a surface to be tested before impact with the surface; measuring, by an accelerometer, a second change in acceleration of the device upon impact with the surface; and determining, by a microprocessor, an integrity of the surface based on the first and second accelerations.

In certain aspects, the method further comprises: calculating, by the microprocessor, a first time duration and a first magnitude of the acceleration based on the measured first change in acceleration; calculating, by the microprocessor, a second time duration and a second magnitude of the acceleration based on the measured second change in acceleration; and generating, by the microprocessor, a surface integrity model based on the first and second time durations and the first and second changes in acceleration.

In certain aspects, the method further comprises comparing the surface integrity model to a plurality of stored surface integrity values; and determining the integrity of the surface based on the comparison.

In certain aspects, the method further comprises associating the impact with one or more surface integrity classifications based on the acceleration data, wherein the surface integrity classifications including a hard surface, a soft surface, and liquid.

In certain aspects, the device is a payload configured to impact the surface at a predetermined point on the device.

In certain aspects, the method further comprises accelerating the payload from an acceleration device toward the surface.

In certain aspects, the device comprises a communication circuit configured to transmit or display information regarding the integrity of the surface from the microcontroller, a power source configured to power the accelerometer, the microcontroller, and the communication circuit, and an exterior housing configured to contain and protect the accelerometer, the microcontroller, the power source, and the communication circuit.

DESCRIPTION OF THE DRAWINGS

These and other advantages of the present disclosure may be readily understood with the reference to the following specifications and attached drawings wherein.

DESCRIPTION

Figure 1B:
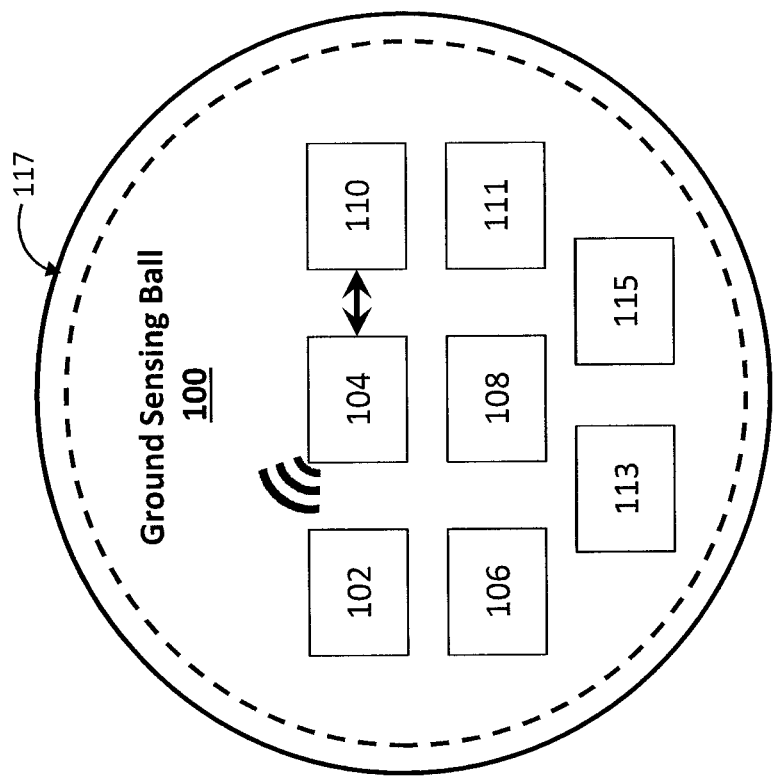
FIGS. 1a and 1b illustrate block diagrams of example devices to measure the integrity of a surface.

Preferred embodiments of the present disclosure may be described herein below with reference to the accompanying drawings. In the following description, well-known functions or constructions are not described in detail because they may obscure the disclosure in unnecessary detail. For this disclosure, the following terms and definitions shall apply.

As used herein, the terms "about" and "approximately," when used to modify or describe a value (or range of values), mean reasonably close to that value or range of values. Thus, the embodiments described herein are not limited to only the recited values and ranges of values, but rather should include reasonably workable deviations. As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

As used herein, the terms "aerial vehicle" and "aircraft" refer to a machine capable of flight, including, but not limited to, both traditional runway and vertical takeoff and landing ("VTOL") aircraft. VTOL aircraft may include fixed-wing aircraft (e.g., Harrier jets), rotorcraft (e.g., helicopters), and/or tilt-rotor/tilt-wing aircraft.

As used herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

As used herein, "memory," "storage medium," etc., as used herein, includes volatile and non-volatile memory, and can be arrays, databases, lists, etc.

As used herein, "microcontroller" includes digital and analog circuitry, discrete or integrated circuitry, microprocessors, DSPs, FPGAs, etc., and software, hardware and firmware, located on one or more boards that form part or all of a controller, and are used to control a process, or a device.

As used herein, "software" includes instructions to a microcontroller or other digital circuit.

Landing aircraft on unknown terrain, especially under reduced visibility, poses significant risks to the aircraft and to the passengers. Terrain uncertainty is a known problem during conflicts, such as the Vietnam War, when helicopters had to be abandoned when they became lodged in marshes after landing without an understanding of the terrain below. One method to estimate properties of a particular terrain is to employ a legged quadrupedal robot designed to observe the dynamics of the leg's impact with a surface (e.g., the ground) to quickly assess surface integrity (e.g., within about 10 ms). In this example, the legged robot can be configured to modify its running gait as the integrity of the terrain surface changed. The method, however, employed a complex leg design and required multiple measurements from the leg dynamics. For example, the legged quadrupedal robot system employed multiple motors, sensors, and a complex computational algorithm based on a linear model similar to one used to analyze a mass, spring, and damper system. Therefore, the process employed by the legged system was iterative, consuming, and involved analyzing a large volume of data. An expanded description of the legged robotic design and force models is described below with reference to FIG. 7.

The present disclosure, however, provides lightweight, low cost systems and methods for determining the integrity of a surface, such as prior to landing an aircraft on unknown terrain. The present disclosure is also relevant to autonomous vertical takeoff and landing VTOL aircraft such as autonomous aerial cargo/utility system, which may not easily distinguish grass, marsh, and lakes from more solid terrain using optical sensors alone. The systems and methods described herein may be applied to manned and unmanned aerial vehicles, and are not limited to VTOL aircraft.

This disclosure presents the concept of a payload device, such as that below-described ground-sensing ball (GSB), which is designed to measure the integrity of unknown terrain prior to landing of an aircraft (e.g., a VTOL aircraft). That is, the present disclosure presents a low cost, simple device that can be dropped onto (or projected toward) the ground to measure impact dynamics during the collision with the ground. This measured information relating to the impact dynamics may then be sent back to the aircraft, operator, autonomous system, remote controller, etc., which can use the measured information in determining the safety of a potential landing zone. In certain examples, the payload device includes an accelerometer, a microcontroller, a wireless communications circuit, and power source (e.g., a battery).

In use, the payload device (e.g., a ground-sensing ball) can be dropped or projected from the aircraft that is approaching a landing zone with unknown structural characteristics. Once released, the accelerometer can measure the flight time to the ground. Upon impact with the ground surface, the accelerometer (and/or a dedicated second accelerometer) can be used to measure changes in the acceleration. The measured impact dynamics (e.g., changes in acceleration) may then be inputted into a linear model to estimate a measurement of the integrity of the surface, for instance, from comparing the impact dynamics to stored data (e.g., a look up table), previously identified parameters, etc., which can be used to classify the surface. For example, the type of surface can correspond to large groups (e.g., hard or soft) providing a binary determination that the surface is (or is not) suitable for landing. In some examples, the surface type can be further classified into one or more subgroups, such as suitable for landing for a particular weight or class of aircraft, or distinguishing the surface material (e.g., asphalt, dirt, water, etc.). While a linear model may be preferred for its computational efficiency, however, a non-linear model is also contemplated.

In certain aspects, the payload device is a GSB configured to provide on-site measurements by which a determination can be made regarding the surface integrity. The GSB can be used in addition to or as an alternative to optical methods of terrain measurement (e.g., LIDAR, radar, visual capture and analysis, etc.). The GSB system components, including sensing and processing hardware and/or software, are compact and lightweight; thereby making them suitable for deployment from aircraft. Thus, the GSB can be a useful tool in providing information for landing VTOL aircraft, especially in low light or visually obscured environments.

Although referred to as a ground sensing ball, the GSB is configured to determine the integrity of any targeted surface; i.e., not limited to ground or earth terrain. Furthermore, the GSB can take any shape suitable for collecting data useful in determining the integrity of the surface. Thus, unless specifically indicated for a particular example, a GSB refers to any payload configured to capture impact dynamics and used to determine the integrity of a target surface. For example, the "ball" may not necessarily be shaped like a sphere. Rather, other shapes that ensure a specific configuration upon impact with the ground may be employed to simplify the computational load and the number of acceleration-vectors that must be measured. For example, shapes and configurations that can control the orientation of impact with the ground may allow for targeted equipment and measurements. Some payloads (e.g., bombs/missiles and/or badminton shuttlecocks) use lightweight fins to guide the configuration of the object in flight. In this manner, the GSB will impact the ground along a single axis, allowing for single axis accelerometer measurements to make a high fidelity determination of the surface integrity.

The GSB can be disposable, such that the components degrade, self-destruct, or otherwise fail to operate after deployment. In other examples, the GSB can be reusable and recovered after deployment, with the capability to be reset and reused. In an example, a physical tether could be secured to the GSB from the aircraft, although caution should be exercised when deploying such a system from an aircraft as the tether can impact measurements by the GSB. Therefore, the tether should be sufficiently loose (e.g., including slack) and lightweight so as to not influence measurements by the GSB. In some examples, a plurality of GSBs can be deployed over an area to determine the integrity of the entire surface area. As described herein, each GSB can measure data regarding each respective impact point, the collected data can be analyzed with reference to each location, and a surface integrity map of the targeted area can be generated. Such a technique can be used to determine the suitability of the area for creating a runway or setting down equipment.

Optical sensors on the aircraft can be used to detect some features of ground, such as vision cameras, lasers, and forward looking infrared radiometers (FLIR). Although data from optical sensors can be analyzed to generate statistically strong correlations (e.g., a surface that looks like asphalt has an expected load capacity), optical systems alone often cannot measure dynamic surface properties without also observing physical interaction with the surface. For example, dry and wet grass may visually appear to be similar, but may exhibit very different mechanical properties when landing an aircraft. In some examples, the data corresponding to the impact dynamics is processed in an integrated microcontroller, such that the determination of landing suitability and/or classification of the surface type is generated within each GSB. The processed information can then be transmitted to the aircraft and/or presented at the GSB (e.g., via an integrated display, speaker, light). In some examples, the raw, unprocessed data may be transmitted to the aircraft for processing, which can then perform analysis in determining whether a particular terrain is safe or suitable for landing. The disclosed systems, methods, and apparatuses may be configured to, inter alia, determine the integrity of a surface by measuring one or more parameters of deployment, include impact dynamic measurements.

Figure 1A:
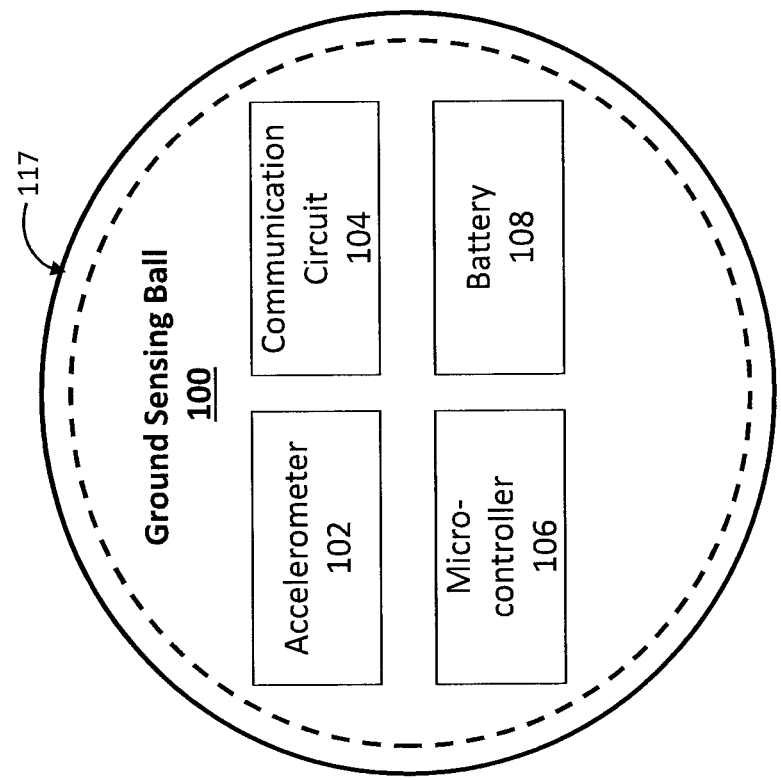

FIG. 1a illustrates an example system for determining the integrity of a surface, such as a ground sensing ball (GSB) 100, in accordance with certain aspects of the present disclosure. As shown, a GSB 100 may contain an accelerometer 102, a communications circuit 104, a microcontroller 106, and a power source, such as, a battery 108. The example communications circuit 104 may include hardware, firmware, and/or software to connect with one or more communications networks, such as the Internet, cellular networks, local wireless networks, and wired networks. For example, the communications circuit 104 may include IEEE 802.X-compliant wireless and/or wired communications hardware for transmitting and/or receiving communications (e.g., between the device and an aircraft). The example microcontroller 106 may be any general-purpose central processing unit (CPU). In some other examples, the microcontroller 106 may include one or more specialized processing units, such as graphic processing units and/or digital signal processors. The microcontroller 106 is configured to execute machine-readable instructions that may be stored locally at the processor (e.g., in an included cache), in a random access memory (or other volatile memory), in a read only memory (or other non-volatile memory such as FLASH memory), and/or in a mass storage device.

In an example shown in FIG. 1b, the GSB 100 includes a user interface 110, which can include one or more multi-touch sensitive panels, buttons, a keyboard, a keypad, a mouse, a trackball, a pointing device, a microphone, an audio speaker, a display device, an optical media drive, a gesture recognition interface, a magnetic media drive, and/or any other type of input and/or output device for activating the GSB 100, adjusting an operational parameter (e.g., whether dropped or projected; whether to transmit data or to make determination internally; whether to display determination), and/or measurement parameter (e.g., type of sensor used, sensor sensitivity) of the GSB 100. A battery charger port and/or data port 111, and/or a display 113 to provide information, lights, and audio may be further incorporated into the GSB 100. In some examples, the user interface 110 and display 113 can be integrated into a single panel (e.g., a touchscreen display). The battery charger and data ports can similarly be collocated. The GSB 100 may further contain an accelerometer 102, a communications circuit 104, a microcontroller 106, and a battery 108, as are utilized in the GSB 100 shown in FIG. 1a. Each of the various components contained within the interior of the GSB 100 of FIG. 1b is shown as a box with its respective reference numeral contained therein.

The GSB 100 may be housed in a casing 117 (or other material) that can be sealed to the environment (e.g., waterproof, dustproof) to protect the components therein. One or more sensors (e.g., accelerometer 102, as well as additional and/or alternative sensors 115 such as a temperature sensor, a humidity sensor, a depth measurement device, a light sensor) as well as the user interface 110 and/or display 113 can be integrated with or otherwise exposed through the casing 117. In other words, the casing 117 can arrange one or more components visible or otherwise manipulable on the casing 117 for adjustment, replacement, recharging (whether external to the casing 117 or accessible via an opening). In certain aspects, the casing 117 may be fabricated from a transparent material to allow the user to view the internal components (e.g., display 113). Accordingly, the GSB 100 may employ as a casing 117 a rigid, sturdy external shell to survive impacts with the surface 112. The casing 117 also may use compliant material (rubber, or a pressurized bladder) to shape the impact dynamics with the surface 112.

The GSB's casing 117 and interior components should be designed to be impact resistant, or "ruggedized." Therefore, when dropped from a substantial height and/or onto a particularly hard surface, the integrity sensing capabilities of the GSB 100 will remain intact. The mechanical properties of the outside of the structure will affect the relationship between acceleration changes measured at the GSB 100 and interaction with the surface properties. For example, if casing 117 of the GSB 100 is very hard (e.g., made of steel) then there will be a very fast transient response when impacting with hard ground (e.g., concrete). Softening the ball can reduce the time scale, which can make for a simpler accelerometer data acquisition process. For example, the outer surface of the casing 117 may be coated with a compliant material. Therefore, the casing 117 may be fabricated using one or more compliant material, including rubber, cast silicon, carbon rubber, and blown rubber, which is durable and can provide some shock absorption.

For instance, consider impact responses on common balls employed in various sports: a basketball, soccer ball, and tennis ball all use air pressure and materials to increase compliance (e.g., flexion) of the ball exterior. In some examples, acceleration data measured from inside a sensing ball may not be able to distinguish a measure of surface hardness above about twice the hardness of the ball itself. A ball with a very soft exterior may interact with different surfaces and only be able to determine that a surface has a threshold level of hardness, but may not have a capacity to measure the specific properties of the surface (e.g., the varying degree of hardness/integrity of the surface). In effect, fine information has been filtered by the mechanical structure before a measurement can be made in the accelerometer 102.

In some examples, the accelerometer 102 may be suspended inside of GSB 100 to insulate the accelerometer from the influence of external mechanical properties of the GSB 100 and/or the casing 117. For example, a rigid external structure may contain a flexible internal structure to support the accelerometer 102, which enables the accelerometer 102 to measure changes in acceleration of the GSB 100 generally, while minimizing the influence of the casing 117 properties on the measurement.

Figure 2A:
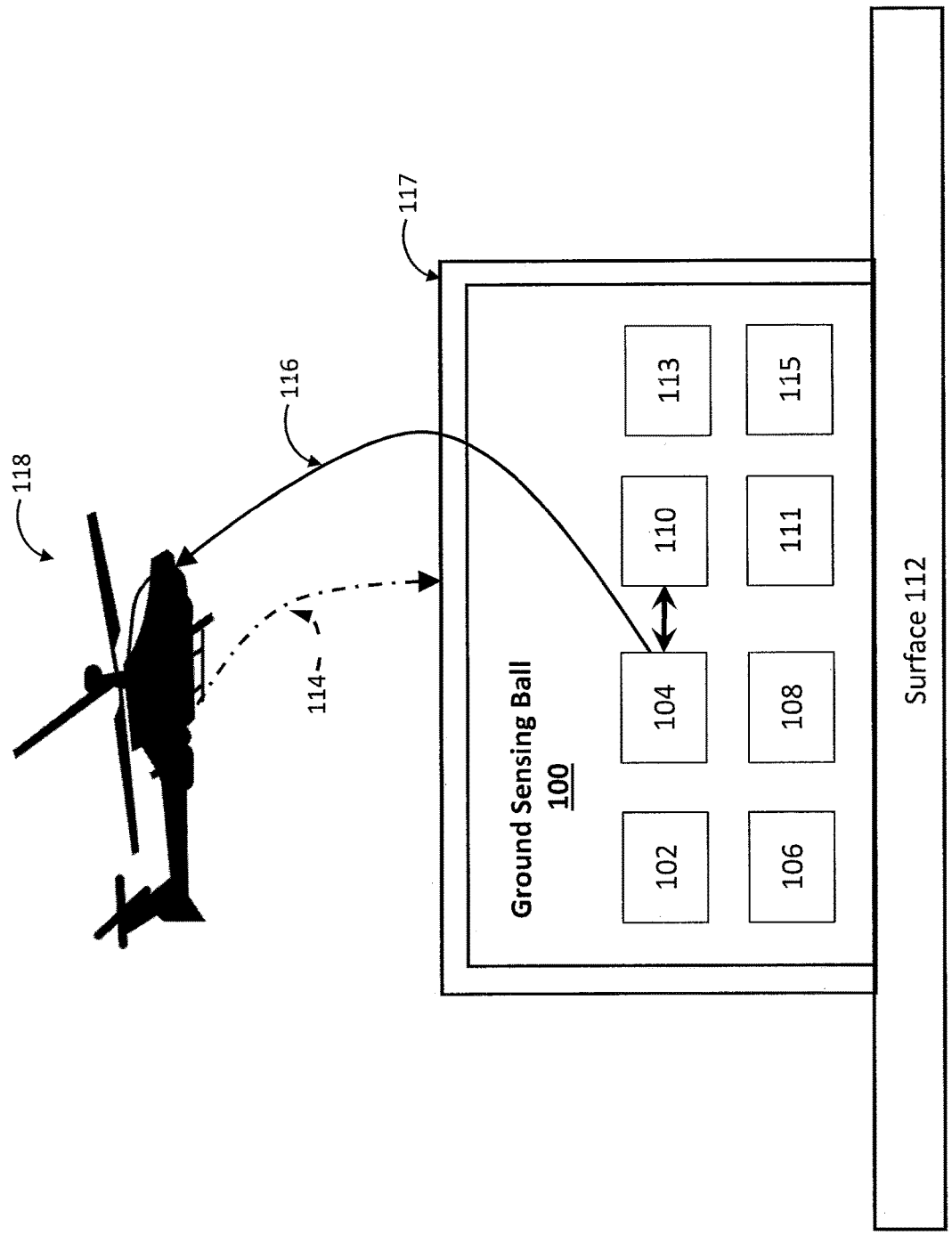
FIG. 2a illustrates an example implementation and flow of information data between an aircraft and the device to measure the integrity of a surface.

Referring now to FIG. 2a, if so configured, the GSB 100 may transmit the accelerometer data from the communications circuit 104 to communications components (e.g., wireless transponder) on the aircraft 118 in real time or near real time (e.g., for each measured change in acceleration) as shown via line 116, such that all processing can be performed on an aircraft computer. For instance, it is contemplated that the aircraft 118 will have onboard computer with greater computational power than that of the microcontroller 106. However, if the GSB 100 lands in water, any transmitted wireless signal will degrade very quickly as signals do not easily travel through water. Thus, near real time transfer can be advantageous. In some examples, the casing 117 is designed to float, by selecting a particular material (e.g., foam rubber), having a sealed encasement, maintaining a certain weight. Thus, if the GSB 100 lands in water information can still be transmitted to the aircraft 118.

In some examples, additionally or alternatively the communication circuit 104 can transmit signals corresponding to the determined surface integrity to the user interface 110. For example, the user interface 110 (via the display) can be configured to present information, such as by lighting up (e.g., in the visible or infrared (IR) spectrums) with certain patterns for hard surface (e.g., green) and soft surface (e.g., red). In some examples, the user interface 110 may include a speaker to generate an audible signal, such that a pitch or pulsed signal can indicate the integrity of the surface. In certain aspects, the communications circuit 104 may employ optical communication techniques, whether visible or invisible to the human eye.

An objective of the present disclosure is for the data processing to distinguish ground (whether hard or soft) from water (or another liquid). For instance, hard ground will result in the GSB 100 coming to rest very quickly after impact with the ground. Deeper water or marsh will have a different dynamic signature, with a lower initial change of acceleration upon impact, followed by an extended period of time before coming to rest.

Figure 2B:
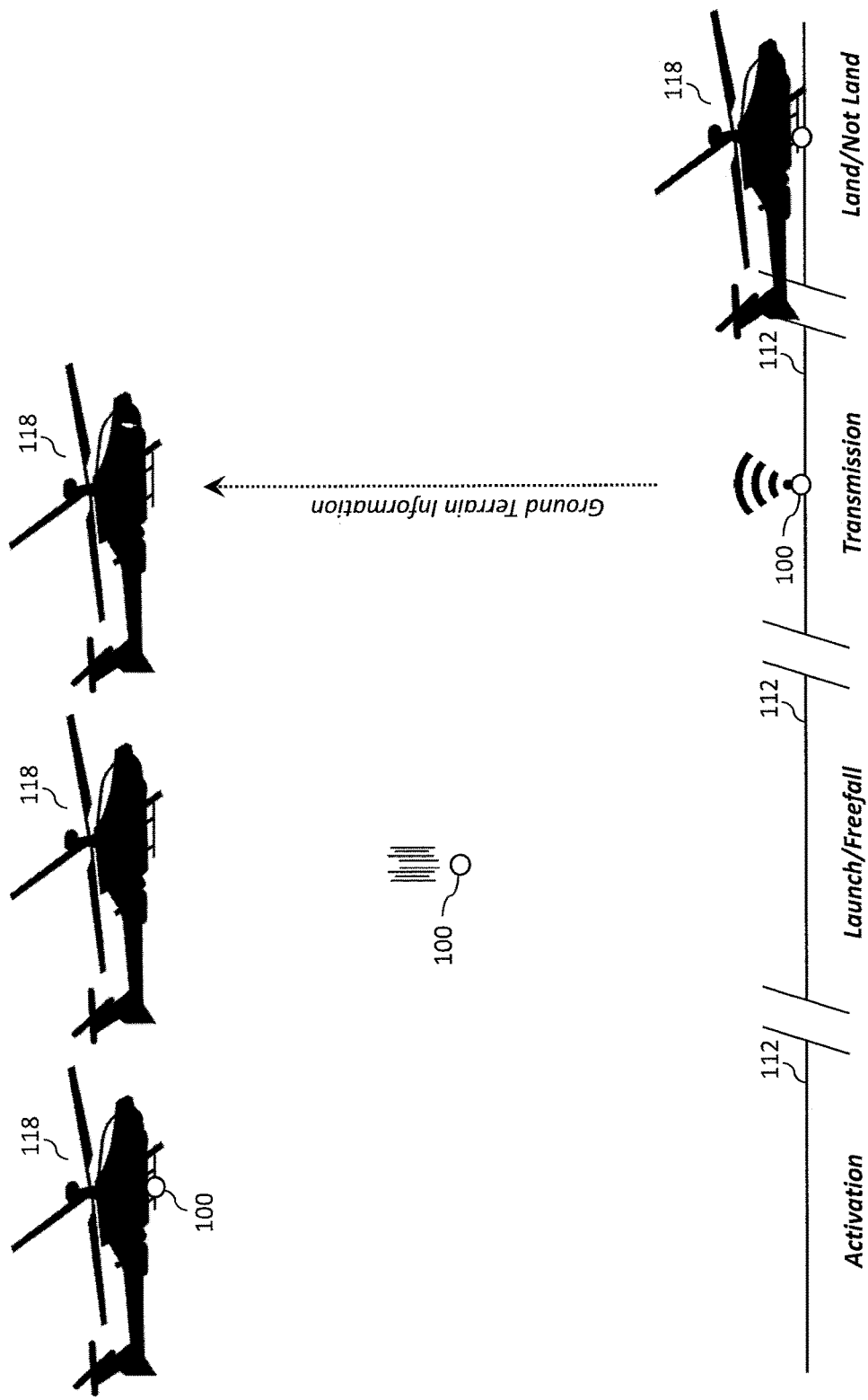
FIG. 2b illustrates an example deployment situation to measure the integrity of a surface.

FIG. 2a illustrates an example implementation and flow of information data between an aircraft and the GSB 100 to measure the integrity of a surface, while FIG. 2b illustrates an example deployment situation of the device. As illustrated in FIG. 2b, the deployment of the GSB 100 generally comprises four phases: an activation phase, a launch/freefall phase, a data transmission phase, and a landing (or not landing/wave-off) phase, as the case may be.

During the activation phase, the GSB 100 may be activated wirelessly (e.g., via electromagnetic signals, audio signals, or optical signals, as shown in line 114 of FIG. 2a), by touch, and/or by vibration patterns (e.g., three hard hits in a row engage the GSB 100). During the launch/freefall phase, the GSB 100 may be passively dropped from the aircraft, or it may be projected by a device designed to discharge the GSB 100 (or another projectile). A benefit of projecting the GSB 100 toward the surface is that the results can be captured more quickly. This is due at least in part to the fact that a passive drop is limited by the force of gravity (less aerodynamic drag). A payload projected toward the surface from an acceleration device (such as a gun), conversely, can exit the vehicle at much higher speeds (e.g., 100 to 1,000 m/s). If dropped from an autonomous vehicle, an electromechanical control mechanism may be used to activate the GSB 100 upon deployment (e.g., a proximity sensor, landing procedure signal).

When the GSB 100 impacts the surface 112 (e.g., ground, water), the impact dynamics will reflect a unique signature of the surface 112. The measured impact dynamics can be used to assess properties associated with the surface 112 and assess whether the particular terrain is safe to land the vehicle (e.g., it is not water, marshland, and quicksand). The distance between the aircraft (deployment height) and the target surface should be low enough to ensure that the GSB 100 lands in the desired landing zone. For example, wind and other environmental effects could cause the GSB 100 to land outside the targeted area. The GSB 100 should therefore be dropped from a height that enables the impact dynamics to be sufficient to capture effective data. In an example, were the GSB 100 to be dropped 1 mm to the surface, the amount of energy generated by the impact would be insufficient to measure the dynamic response of the GSB 100 and the surface.

A minimum drop height for the GSB 100 may be determined as a function of the resolution of the sensor(s), the bandwidth of the sensor(s), and/or the ability of the mechanical system (e.g., the GSB 100 interacting with the ground) to excite a measurable dynamic response. For example, a drop from an altitude of 1 millimeter would result in only a momentary measure of $-9.81$ m/s$^2$ acceleration during free fall, where the acceleration would be zero upon the sensor coming to a rest. As there would be very little impact velocity, the impact dynamics would be virtually invisible to conventional accelerometers. Therefore, an increase minimum drop height (e.g., at least 1 meters, more preferably at least 2 to 3 meters) may be used to provide practical sensor resolution. The maximum drop height, however, may be limited by mechanical strength of the GSB 100 (which can be made very strong) and a maximum measurable acceleration of the accelerometer 102. Typically, an accelerometer 102 has maximum acceleration of 5, 10, or 100 g's, where 1 g=9.81 m/s$^2$; however, the mechanical properties of the GSB 100 and any suspension between the casing 117 and the accelerometer 102 can be used to "tune" the accelerometer 102 to the GSB 100 application.

Measurement fidelity can be achieved when the range of the accelerometer 102 is matched with the changes in acceleration experienced by the GSB 100 during deployment. For example, time dynamics of the impact can be captured by a measurement system (e.g., accelerometer 102 and/or microcontroller 106) with a capability to measure acceleration at a rate of at least 10 to 30 times faster than the critical impact frequency. For instance, if the impact dynamics are captured during an event with a duration of approximately 0.01 seconds, then the measurement system should acquire data at a rate greater than 1,000 Hz.

In some examples, the GSB 100 can be configured to impact a surface such that forces and/or vibrations are generated similar to forces and/or vibrations are generated by the aircraft during landing. Configurations to the weight, size, shape, and force by which the GSB 100 is projected at the surface can affect the forces experienced by the GSB 100 upon impact. Similarities in the two impact signatures will aid in measurement integrity.

Ground terrain information may be transmitted from the GSB 100 to the aircraft during the transmission phase. The ground terrain information may include, for example, the raw measured data or processed data. For example, the measured data may be processed at the GSB 100 and transmitted to the aircraft as processed data (e.g., go, no go, type of terrain). Alternatively, raw data may be transmitted from the GSB 100 to the aircraft, where the raw data is processed at the aircraft. An advantage of processing raw data at the aircraft is that the processor would not be confined to the design constraints of the GSB 100 (e.g., size, power requirements). During the landing phase, the aircraft may decide whether to land (or wave off) based upon the ground terrain information. If the aircraft decides not to land based on the ground terrain information, the deployment process may be repeated with a new proposed landing area.

Figure 3:
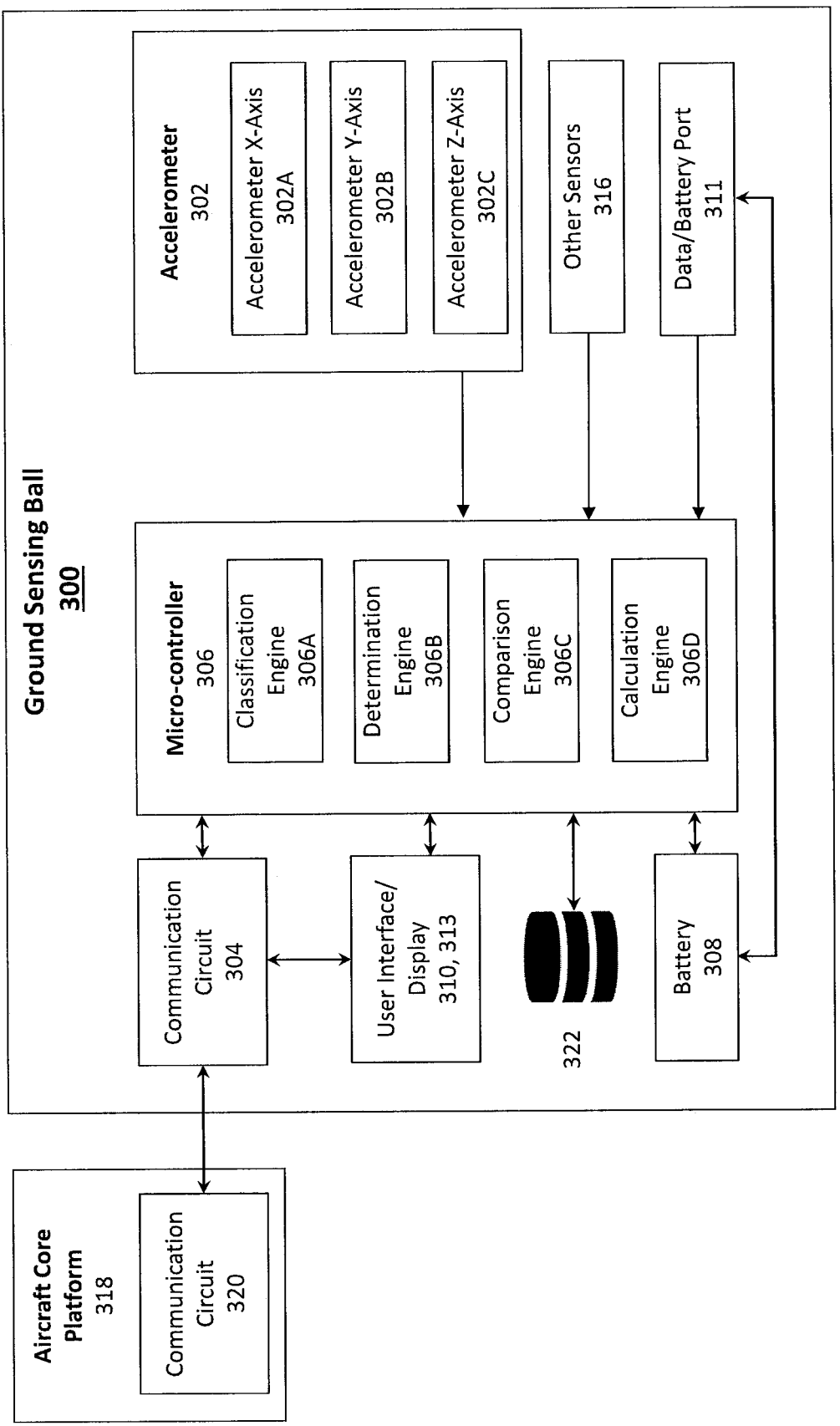
FIG. 3 illustrates another block diagram of an example device to measure the integrity of a surface.

FIG. 3 illustrates another example GSB 300, which can include functions and components similar to those described with respect to GSB 100 of FIGS. 1a through 2b. As provided in FIG. 3, the GSB 300 contains an accelerometer 302 configured to measure acceleration in three axes: the X-axis 302A, the Y-axis 302B, and the Z-axis 302C. Although illustrated with three axes, the GSB 300 may contain a single accelerometer, such as when the GSB 300 is configured as a directed payload (e.g., a missile, projected from an acceleration device such as a gun). Data from the accelerometer can be transmitted to a microcontroller 306 for analysis and modeling. For example, a calculation engine 306D can apply a model (e.g., a linear model) to the captured impact dynamics to aid in determination of the integrity of the surface. A comparison engine 306C can compare raw acceleration data and compare it to a library of models in a storage medium 322, such as a hard drive, a solid-state storage drive, a hybrid drive, a RAID array, and/or any other mass data storage device. Based on the comparison, a determination as to the hardness, and therefore suitability for landing, of the surface can be made in determination engine 306B. A further classification of the surface can be identified in the classification engine 306A as to the sub-grouping of the surface, such as whether a hard surface comprises rock or dirt, or if a soft surface comprises water or mud.

Information regarding the determined integrity of the surface and any classification thereof can be presented to a user and/or remote system in several ways. For example, the information can be transferred to a user interface 310 and/or display 313. The user interface 310 can communicate by light, sound, text, or other manner of presentation. The use of a display/light is best suited for environments where the targeted surface will remain within the line of sight of the aircraft. Additionally or alternatively, the accelerometer data can be transmitted to an aircraft core platform 318. The aircraft core platform 318 can contain a communication circuit 320 configured to receive and/or send signals between the GSB 300 and the aircraft (e.g., aircraft 118) via communication circuit 304. In some examples, the microcontroller 306 performs all necessary analysis, and provides the aircraft core platform 318 with a determination and/or classification of the targeted surface's integrity. The aircraft core platform 318 is then configured to present information carried in the signals to a pilot and/or autonomous decision maker (e.g., for drones and/or autonomous flight systems). Based upon the analysis and determination, the aircraft will land or continue to search for a surface suitable for landing.

In other examples, the raw data is collected from the accelerometer 302 upon impact and transmitted directly to the aircraft core platform 318. For example, the aircraft may have greater computation capabilities and power storage, which may allow for fast and robust analysis of the data. In some examples, transmitting raw data from the GSB 300 is quick, which can benefit a moving aircraft.

Additionally or alternatively, a data port 311 can be included in the GSB 300. The data port 311 can be used to provide updates to operating software, which can be stored in storage medium 322 and/or integrated with the microcontroller 306. In some examples, the GSB can be recovered after deployment, and data corresponding to the impact dynamics can be uploaded via the data port 311. The data can be used to build impact models for comparison during deployment of the GSB 300. In some examples, the data port 311 can serve as a battery charging port, such as to recharge battery 308. In examples, the data port 311 can be a universal serial bus (USB) port for interfacing with one or more USB-compliant devices, a FireWire, a field bus, and/or any other type of interface capable of sending and receiving information and/or power to the battery and/or other system (e.g., microcontroller 106, accelerometer 102).

In some examples, the user interface 310 can accept commands from a user, such as to activate the GSB 300, in preparation for deployment. In other examples, the GSB 300 can automatically activate, such as in response to a wireless command signal (e.g., an optical or radio signal from the aircraft core platform 318), a change in acceleration, a particular vibration pattern. Additional or alternative commands can include configuration data, as well as responsive human machine interfaces (HMI) to present a list of choices (e.g., a particular mode of presentation, deployment). The HMI can be configured as a graphical user interface (GUI) which can change according to a particular software update, particular type of deployment, type of aircraft to support, desired information to accept and/or present.

Figure 4:
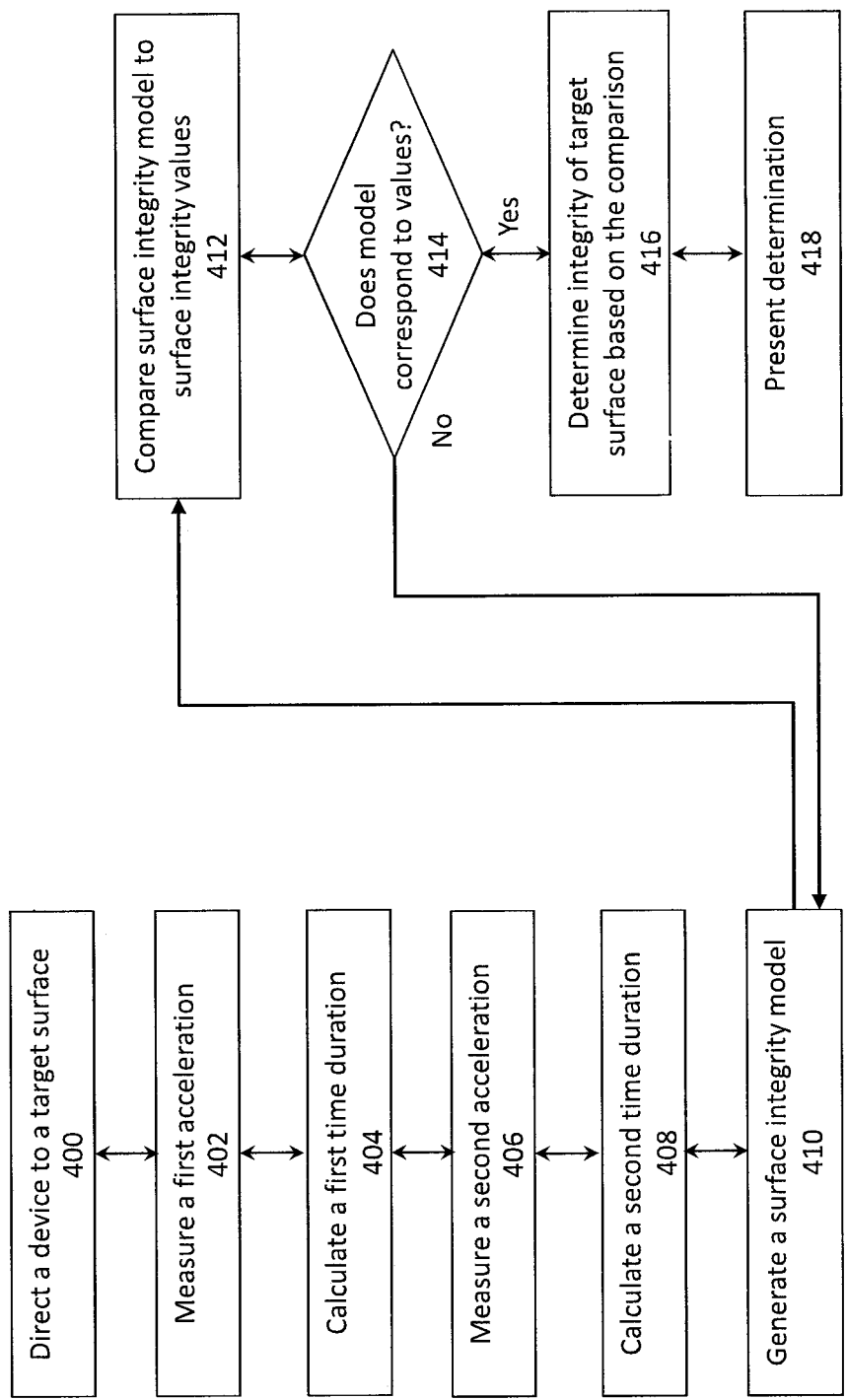
FIG. 4 illustrates a diagram of an example method of measuring the integrity of a surface.

FIG. 4 illustrates a flowchart illustrating example machine-readable instructions, which may be executed by a microcontroller (e.g., microcontroller 106, 306) to determine the integrity of a surface, in accordance with the present disclosure. The example instructions may be stored on any non-transitory machine-readable media, such as storage medium 322 described in FIG. 3.

In block 400, a device (e.g., GSB 100, 300) is directed toward a target surface (e.g., surface 112). The device can be dropped, thrown, or projected toward the target, as described herein. In block 402, a first acceleration is measured (e.g., via accelerometer 102, 302), such as during the time from deployment to before impact. At block 404, a time is calculated of the period associated with the first acceleration. Upon impact with the surface, a second acceleration is measured at block 406. At block 408, a time is calculated for the period associated with the second acceleration.

Based on the first and second measured accelerations and the first and second calculated times, a surface integrity model is generated (e.g., via calculation engine 306D of microcontroller 106, 306) at block 410. In some examples, the surface integrity model is generated at a remote processor/computer (e.g., aircraft core platform 318), as described herein. In some examples, the surface integrity model is compared (e.g., via comparison engine 306A) against a library or matrix of stored values (e.g., in storage medium 322) in block 412. A determination is made as to whether the generated model corresponds to a stored value in block 414. If the generated model does not correspond to a stored value, the data may be corrupted, or another model may be required (e.g., a second linear model may be applied; a non-linear model may be applied). Thus, if no match is found to the generated model, the method can return to block 410 to generate an additional or alternative model, which can then be compared against the store of values in block 412. Although described as having a store of values associated with the internal components of the GSB, in some examples the library or matrix of values may be accessed via a network (e.g., by use of communications circuit 304), in either a data storage device located on the aircraft core platform 318 and/or in cloud storage.

If the comparison does yield a suitable match (e.g., an exact match; a value within a threshold amount of the calculated value; an interpolated value between two stored values), the method proceeds to block 416, where the integrity of the surface is determined. The determination can be performed by the integrated microcontroller (e.g., microcontroller 106, 306) to provide a determination of hard or soft (e.g., suitable for landing/not suitable for landing via determination engine 306B) and/or additional classifications (e.g., type of surface via comparison engine 306C). Once the determination and/or classification has been made, the information is presented for consideration, be it remotely (e.g., at the aircraft 118) and/or at the GSB (e.g., via user interface 110, 310). Based on the information, the decision as to whether the surface is suitable for landing can be made, by a human operator and/or an autonomous system (e.g., the aircraft core platform 318 and/or other remote control center/device).

Figure 5:
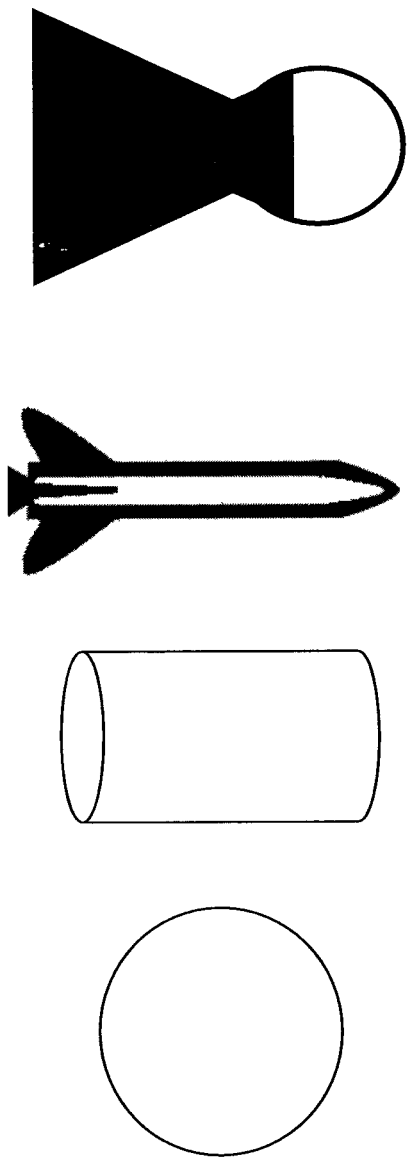
FIG. 5 illustrates example designs for a ground sensing ball (GSB) payload.

FIG. 5 illustrates a variety of contemplated shapes for the GSB 100 (e.g., its casing 117). For instance, the GSB 100 can take the shape of a ball (sphere) 502, a cylinder 504, a missile/bullet/rocket 506, a shuttlecock 508, or any other shape desired for a particular terrain. Although a number of designs and/or shapes are described herein, any other such shape and/or design suitable for determining the integrity of a surface, as described herein, are within the scope of the present disclosure.

Figure 6:
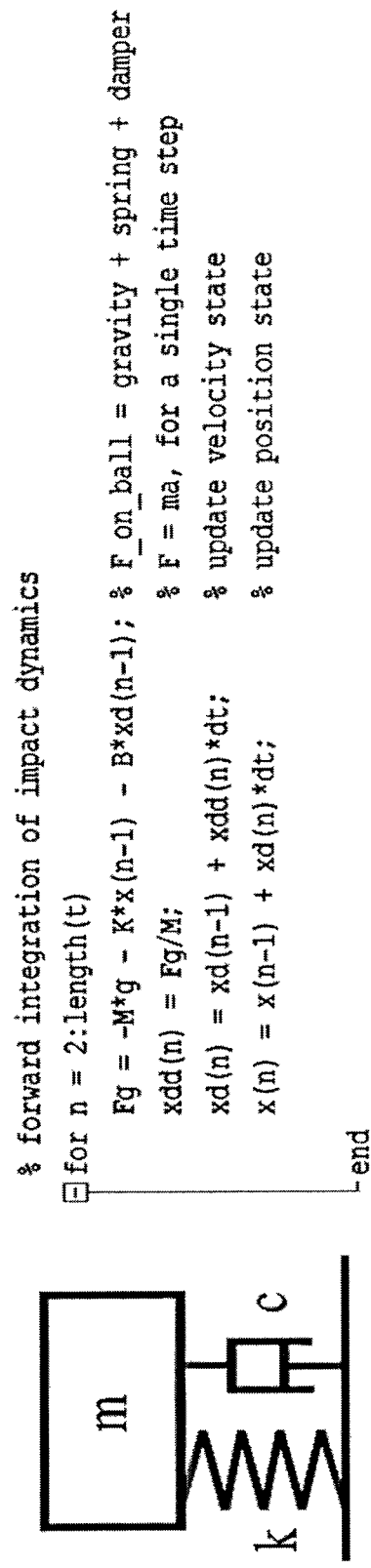
FIG. 6 illustrates an example linear model for measuring the integrity of a surface.

FIG. 6 illustrates an example linear model that can be used as a basis for generating a surface integrity model based on the data captured during deployment of the GSB. In the example provided in FIG. 6, the data is processed by fitting the acceleration data into a model of impact. One such model is the linear mass spring damper system; however, non-linear models can be used in addition to or as an alternative to a linear model. In order to determine the suitability of a surface for landing, accurate modeling of each characteristic of the ground is not needed. The mathematical models are designed to identify a threshold stiffness or hardness of the surface. The model is also designed to identify whether a surface is a solid or a liquid (e.g., water).

On a solid surface (e.g., solid ground), the GSB 100 may only deflect a few millimeters upon impact. Impact displacement can be estimated by numerically integrating the acceleration of impact over time, assuming a known impact velocity. However, it is not critical to measure displacement accurately, but this is the mechanical principle. Instead, the acceleration profile may be measured for magnitude and duration, and possibly via a physics-based model. Comparatively, if the GSB 100 lands in water, the GSB 100 will decelerate for a much longer period of time and the impact displacement will be much larger. Although described in view of a linear model based on spring damper system, multiple models and methods of processing the impact dynamics data can be useful in determining the integrity of a surface and its' suitability for landing.

In an example mathematical model, the acceleration of the GSB is expected to have a greater magnitude and a shorter duration for very stiff ground. In other words, the impact dynamics will provide a very large change in acceleration in a very short period of time. For a more compliant surface, the acceleration will change more slowly and have a smaller magnitude. Upon analysis, the model (e.g., executed via the microcontroller and/or a vehicle mounted processor) can determine whether the ground is hard or soft. The model can also identify multiple variations between a representative hard surface (e.g., solid concrete) and a representative soft surface (e.g., marshland, viscous mud). The various classifications can identify the surface as being suitable for landing a smaller aircraft, suggest landing at slower speeds, and require the use of flotation devices.

Additionally, the impact depth can be measured either by estimation from the measured acceleration profile, or measured using a specific metric (e.g., visual markings). Along with the aforementioned impact dynamics, the impact depth can be coupled with other information such as GSB weight, speed at impact, housing material characteristics, temperature to generate a comprehensive model of the surface integrity.

The captured data can be compared against a matrix and/or library of data corresponding to known and/or expected surfaces. For example, prior to deployment in a real world setting and/or based on previous deployments of similar devices, empirical testing of the GSB can be conducted on various surfaces. Based on these experiments, the library can be located in the storage medium 322, at the aircraft core platform 318, at a networked data storage medium and contain multiple models corresponding to hard and soft, safe and unsafe surface types. Upon analysis, impact dynamics data can be compared against the stored models to determine the integrity of the surface.

After being dropped/projected toward the target surface 112, the GSB 100 may achieve an acceleration in flight of approximately 9.81 m/s$^2$ (with variations due to aerodynamic effects). The impact with the ground will result in a sharp trajectory. The trajectory will have a fundamental frequency of between approximately 1 ms and 10 ms, and could result in many multiples of "g" (i.e., one "g" is the acceleration due to gravity at the Earth's surface and is the standard gravity). For instance, from 1 g, to 10 g's and possibly 100 g's or more. If measured with sufficiently sensitive sensors, the response will resemble a mass-spring-damper system (see supra) that is settling from an initial velocity. Based on this mathematical understanding, linear model fitting (i.e., linear system identification) techniques may be suitable for capturing the basic structural properties of the surface based on the impact dynamics described herein.

A linear fitting technique offers certain benefits, as the impact velocity does not need to be known a priori—linear model responses are invariant in shape. This can enable scaling of the acquired data and provide significant flexibility to the require drop-height of the system while generating good resulting data and analysis. In some examples, nonlinear fitting, whether model based or from empirical testing, can also be used.

Figure 7:
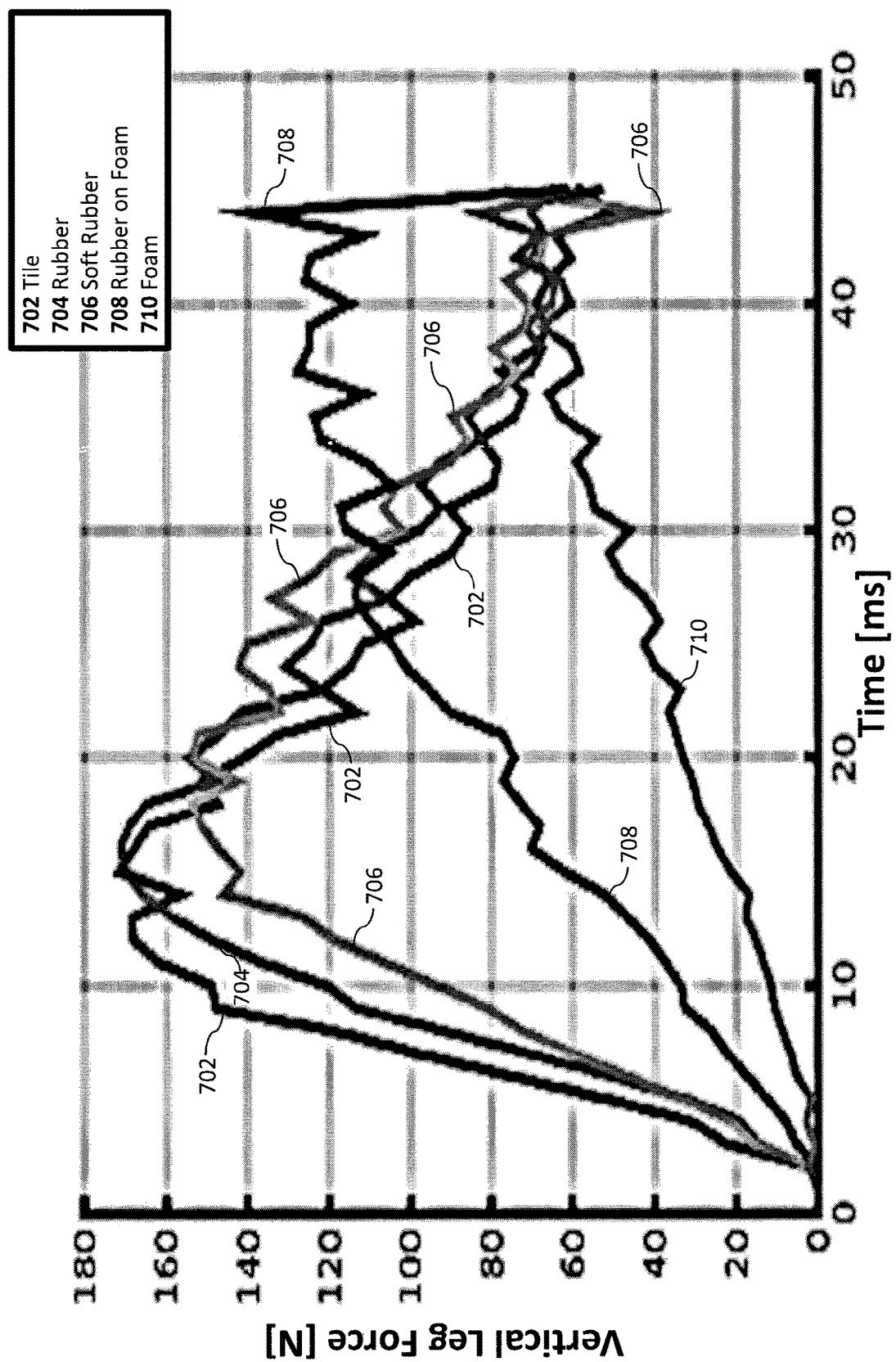
FIG. 7 illustrates an example graphical analysis of force measurements generated by a legged robotic system.

FIG. 7 provides an example of force data that can be acquired by the example legged robot, which determined ground properties by measuring the impact response of a robotic leg interacting with different ground types. For example, when the leg first landed on soft ground (e.g., foam), the resulting force trajectory through the leg would be significantly slower and lower impact than when the leg landed on hard ground (e.g., tile). FIG. 7 provides an example of force trajectories measured by the leg as it impacted the ground.

A trial corresponding to each ground type was measured while the legged robot was landing from a vertical jump. The data show the leg's response for 45 ms following impact, and demonstrates that interaction with the ground types of different stiffness results in different impact responses in the leg. A physical model was developed to enable the use of this type of data to estimate ground stiffness quickly and in-situ. Note that the force data were not acquired using a force sensor at the foot. The force was estimated by measuring feedback from the leg motors and estimating the resulting foot force from that feedback.

By contrast, the GSB 100 measures ground integrity using measurements from the accelerometer 102 as the GSB 100 is dropped/projected from the aircraft to the surface. Thus, the application, measurements, processing, comparison data are significantly different from the analysis performed with respect to the legged robot. For example, the ground stiffness estimation is based on measurements from the control system feedback of the robot leg and processing of data related to the kinematics (i.e., the displacement) of the robotic leg. In other words, with the data corresponding to leg force and leg displacement, a model of the mechanical impedance of the ground was created.

The present methods and systems may be realized in hardware, software, and/or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the disclosure may therefore be practiced otherwise than as specifically described above.

What is claimed is:

1. A device to determine integrity of a surface, the device comprising:
    an exterior housing to contain and protect a plurality of components, the plurality of components including:
    an accelerometer to measure a change in acceleration of the device;
    a microcontroller to:
        monitor measurement data from the accelerometer; and
        determine the integrity of the surface based on the measurement data;
    a communication circuit to transmit or display information regarding the integrity of the surface from microcontroller; and a power source to power the accelerometer, the microcontroller, and the communication circuit.

2. The device as defined in claim 1, wherein the microcontroller is configured to:
compare the measured change in acceleration to a plurality of stored acceleration values corresponding to one or more parameters associated with surface integrity; and
determine the integrity of the surface based on the comparison.

3. The device as defined in claim 1, wherein the microcontroller is configured to identify one or more events based on the measurement data, the events including descent and impact with the surface.

4. The device as defined in claim 2, wherein the one or more parameters comprise a change in acceleration during a descent phase or a change in acceleration during an impact phase.

5. The device as defined in claim 4, wherein the one or more parameters further comprises a time duration of the descent phase or a time duration of the impact phase.

6. The device as defined in claim 5, wherein the microcontroller is configured to associate the impact with one or more surface integrity classifications based on the acceleration data, the surface integrity classifications including a hard surface, a soft surface, and liquid.

7. The device as defined in claim 1, wherein the communication circuit comprises one of a transponder, a transceiver, or a repeater.

8. The device as defined in claim 7, wherein the communication circuit is configured to transmit the measurement data to a remote processor to determine the integrity of the surface.

9. The device as defined in claim 8, wherein the remote processor is associated with an aircraft and is used to determine whether the surface is suitable for landing by the aircraft.

10. The device as defined in claim 1, wherein the exterior housing comprises a rigid external structure having a flexible internal structure to support and insulate the accelerometer from the rigid external structure.

11. The device as defined in claim 1, wherein the exterior housing is sealed and the device is configured to float.

12. The device as defined in claim 1, further comprising a display to generate a lighted signal indicating the integrity of the surface.

13. The device as defined in claim 1, wherein the device comprises the first-mentioned accelerometer and two additional accelerometers that cooperate with the first-mentioned accelerometer to measure changes in acceleration along three orthogonal axes.

14. A method of determining integrity of a surface, comprising:
measuring, by an accelerometer, a first change in acceleration of a device traveling toward a surface to be tested before impact with the surface;
measuring, by an accelerometer, a second change in acceleration of the device upon impact with the surface; and
determining, by a microprocessor, an integrity of the surface based on the first and second accelerations.

15. The method of claim 14, further comprising:
calculating, by the microprocessor, a first time duration and a first magnitude of the acceleration based on a measured first change in acceleration;
calculating, by the microprocessor, a second time duration and a second magnitude of the acceleration based on a measured second change in acceleration; and
generating, by the microprocessor, a surface integrity model based on the first and second time durations and the first and second changes in acceleration.

16. The method of claim 15, further comprising:
comparing the surface integrity model to a plurality of stored surface integrity values; and
determining the integrity of the surface based on the comparison.

17. The method of claim 14, further comprising:
associating the impact with one or more surface integrity classifications based on the acceleration data,
wherein the surface integrity classifications including a hard surface, a soft surface, and liquid.

18. The method of claim 14, wherein the device is a payload configured to impact the surface at a predetermined point on the device.

19. The method of claim 18, further comprising accelerating the payload from an acceleration device toward the surface.

20. The method of claim 14, wherein the device comprises a microcontroller, a communication circuit configured to transmit or display information regarding the integrity of the surface from the microcontroller, a power source configured to power the accelerometer, and the communication circuit, and an exterior housing configured to contain and protect the accelerometer, the microcontroller, the power source, and the communication circuit.

* * * * *